United States Patent
Chen et al.

(10) Patent No.: US 8,208,223 B2
(45) Date of Patent: Jun. 26, 2012

(54) DIMPLE FORMING APPARATUS AND DIMPLE FORMING METHOD

(75) Inventors: Canhua Chen, DongGuan (CN); Hiroshi Fukaya, Hong Kong (CN); Yiusing Ho, Hong Kong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 444 days.

(21) Appl. No.: 12/458,032

(22) Filed: Jun. 29, 2009

(65) Prior Publication Data

US 2010/0328820 A1 Dec. 30, 2010

(51) Int. Cl.
*G11B 21/21* (2006.01)

(52) U.S. Cl. .................................................... 360/245.1
(58) Field of Classification Search ................. 360/245.1
See application file for complete search history.

(56) References Cited

U.S. PATENT DOCUMENTS

| | | | |
|---|---|---|---|
| 4,466,036 A * | 8/1984 | Ishida et al. | 242/345.3 |
| 6,078,470 A * | 6/2000 | Danielson et al. | 360/245.1 |
| 2009/0091858 A1 * | 4/2009 | Nojima et al. | 360/244.2 |
| 2009/0097162 A1 * | 4/2009 | Horiuchi | 360/244.2 |

* cited by examiner

*Primary Examiner* — Mark Blouin
(74) *Attorney, Agent, or Firm* — Nixon & Vanderhye PC

(57) ABSTRACT

A dimple forming apparatus for forming dimple on a workpiece at a desired position comprises a base mold with a concave surface, a heating unit and a forming pin with a spherical surface. The base mold is configured to be positioned below the workpiece. The heating unit is configured to heat the desired position of the workpiece for enhancing tractility of the desired position of the workpiece, and the forming pin is configured to be positioned above workpiece with the spherical surface of the forming pin aiming toward the desired position of the workpiece heated by the heating unit. The heating unit successfully enhances the tractility of desired position of the workpiece before the desired position of the workpiece is punched by the forming pin, and produces low stress at the junction of the dimple formed by the forming pin punching and the workpiece of the workpiece. The present invention also discloses a dimple forming method, a head gimbal assembly and a method for manufacturing a head gimbal assembly.

14 Claims, 8 Drawing Sheets

DIMPLE FORMING APPARATUS AND DIMPLE FORMING METHOD

FIELD OF THE INVENTION

The present invention relates to information recording disk drive devices and, more particularly, to a method for forming a dimple on a suspension of the disk drive devices, and an apparatus for forming the dimple on the suspension.

BACKGROUND OF THE INVENTION

One known type of information storage device is a disk drive device that uses magnetic media to store data and a movable read/write head that is positioned over the media to selectively read from or write to the disk.

FIG. 1 illustrates a conventional disk drive device and shows a magnetic disk 101 as a medium for information/data storage mounted to and rotating round a spindle motor 102 at a high speed. A head gimbal assembly (HGA) 100 comprises a slider 104 containing read/write head for electric/magnetic signal transform and a suspension 110 mounting on the slider 104. The HGA 100 is attached to an arm 105 which rotates round a bearing 106. A voice-coil motor (VCM) 107 is provided for controlling the rotation of the bearing 106 and further controlling the movement of the arm 105 and, in turn, controlling the slider 104 to move from track to track across the surface of the disk 101, thereby enabling the read/write head to read data from or write data to the disk 101.

Now referring to FIG. 2, the suspension 110 includes a load beam 111, a base plate 112, a hinge 113 and a flexure 114, all of which are assembled together. In operation, the magnetic disk 101 creates an air bearing on which the slider 104 floats. The suspension 110 provides a spring force to counteract the force generated by the air bearing to position the slider at a "fly height". Specifically, referring to FIGS. 3a-3b, the load beam 111 of the suspension 110 includes a dimple 115 thereon to transfer the spring forces generated by the load beam 111 to the flexure 114 at a position corresponding to a center of the slider 104. By this engagement of the dimple 115 with the flexure 114, the spring forces can be transferred to the slider 104 uniformly, thus making the slider 104 pitching and rolling at the fly height in response to fluctuations in the air bearing created by variations in the surface of the rotating disk 101. In this manner, the slider 104 is supported and can be positioned over the disk 101 by the HGA 100 in the disk drive to access or create information on the disk 101. In the operation process of the HGA 100 explained above, the dimple 115 of the suspension 110 plays an important role in achieving high precision read-write literacy of the slider 104, thus disk drive manufacturers are constantly seeking ways to form an excellent dimple 115 on the load beam 111.

FIGS. 4a-4b show a conventional dimple forming process. As shown in FIG. 4a, a base mould 210 is provided under the load beam 111 with a concave surface 211 of the base mould 210 aiming toward a first surface 116 of the load beam 111 at a position desired to form a dimple. A forming pin 220 is provided above the load beam 111 with a spherical surface 221 of the forming pin 220 aiming toward a second surface 117 of the load beam 111 opposite the first surface 116 at the position desired to form the dimple and punches the load beam 111 onto the base mould 210 in a first direction (shown as arrow V1), in which way a dimple 115 is formed on the load beam 111. Referring to FIG. 4b, the forming pin 220 moves away from the second surface 117 of the load beam 111 in a second direction (shown as arrow V2), and it is clearly shown that the dimple 115 formed by the forming pin 220 has a convex side on the first surface 116 of the load beam 111 and a concave side on the second surface 117 4 of the load beam 111.

However, in the process of forming a desired dimple on the load beam 111 mentioned above, because of no preparatory treatment performed on the load beam 111, the load beam 111 is deformed rapidly and violently in the forming pin punching step, which in turn, produces high stress at the junction of the dimple 115 and the load beam 111. This affects static attitude of the load beam 111 of the suspension 110, and further affects the assembly of the slider 104 with the suspension 110 of the HGA 100, and in turn, affect slider's read/write ability of the assembled HGA 100.

Hence, a need has arisen for providing improved dimple forming apparatus and method that do not suffer from the above-mentioned drawbacks.

SUMMARY OF THE INVENTION

Accordingly, one object of the present invention is to provide a dimple forming apparatus able to form a dimple on a workpiece with low stress.

A further object of the present invention is to provide a dimple forming method capable of forming a dimple on a workpiece with high accuracy.

Another object of the present invention is to provide a head gimbal assembly, in which a load beam has a low-stress dimple thereon to improve slider's read/write ability.

Still another object of the present invention is to provide a method for manufacturing a head gimbal assembly capable of forming a low-stress dimple on a load beam to improve slider's read/write ability.

To achieve the above-mentioned objectives, a dimple forming apparatus for forming a dimple on a workpiece at a desired position comprises a base mould with a concave surface, a heating unit and a forming pin with a spherical surface. The base mould is configured to be positioned below the workpiece. The heating unit is configured to heat the desired position of the workpiece for enhancing tractility of the desired position of the workpiece, and the forming pin is configured to be positioned above the workpiece with the spherical surface of the forming pin aiming toward the desired position of the workpiece heated by the heating unit.

Preferably, the heating unit heats to soften the desired position of the workpiece into the concave surface of the base mould, the desired position of the workpiece softened by the heating unit forms a convex side surface thereof corresponding to the concave surface of the base mould and a concave side surface thereof opposite the convex side surface, and the spherical surface of the forming pin aims toward the desired position of the workpiece heated by the heating unit according to the center of the concave side surface of the desired position.

Preferably, the heating unit comprises a wave beam with a feature of heatability, and the heating unit sends the wave beam to heat the desired position of the workpiece.

Preferably, the base mould further comprises a hole adjoining the concave surface, and the wave beam sent by the heating unit passes through the hole to heat the desired position of the workpiece.

Preferably, the heating unit is positioned below the concave surface of the base mould.

Preferably, the wave beam is laser or soft beam.

Preferably, the workpiece is load beam of a suspension of a head gimbal assembly.

A dimple forming method for forming a dimple on a workpiece at a desired position comprises the steps of: providing a base mould with a concave surface and positioning the base mould base below the workpiece; providing a heating unit and the heating unit heating the desired position of the workpiece to enhance tractility of the desired position of the workpiece; providing a forming pin with a spherical surface and positioning the forming pin above the workpiece; aiming the spherical surface of the forming pin toward the desired position of the workpiece heated by the heating unit; and making the forming pin punching the workpiece.

Preferably, the heating unit heats to soften the desired position of the workpiece into the concave surface of the base mould, the desired position of the workpiece softened by the heating unit forms a convex side surface thereof corresponding to the concave surface of the base mould and a concave side surface thereof opposite the convex side surface, and the step of aiming the spherical surface of the forming pin toward the desired position of the workpiece heated by the heating unit comprises: aiming the spherical surface of the forming pin toward the desired position of the workpiece heated by the heating unit according to the center of the concave side surface.

Preferably, the heating unit comprises a wave beam with a feature of heatability, and the step of the heating unit heating the desired position of the workpiece comprises: the heating unit sending the wave beam; the wave beam heating the desired position of the workpiece.

Preferably, the base mould further comprises a hole adjoining the concave surface, the step of the wave beam heating the desired position of the workpiece comprises: the wave beam passing through the hole to heat the desired position of the workpiece.

Preferably, the method further comprises a step after the step of providing a heating unit: positioning the heating unit below the concave surface of the base mould.

A head gimbal assembly comprises a slider, a suspension having a flexure to support the slider and a load beam assembled with the flexure. The load beam has a dimple thereon formed according to the dimple forming method of the present invention, and the dimple of the load beam engaging with the flexure at a position corresponding to a center of the slider.

A method for manufacturing a head gimbal assembly comprises the steps of: proving a load beam; forming a dimple on the load beam according to the dimple forming method of the present invention; providing a flexure with a slider supporting area; assembling the load beam and the flexure with the dimple of the load beam engaging with a center of the slider supporting area of the flexure; and providing a slider and potting the slider onto the slider supporting area of the flexure.

In comparison with the traditional dimple forming process, the present dimple forming process employs a heating unit to heat the desired position of the workpiece before the desired position of the workpiece is punched by the forming pin, thus the desired position of the workpiece possesses sound tractility, which facilitates the workpiece punched by the forming pin with buffering to be deformed gradually. Thus, the workpiece produces low stress at the junction of the dimple formed by the forming pin punching and the workpiece.

In addition, the heating unit heats to soft the desired position of the workpiece into the concave surface of the base mould, thus the desired position of the workpiece forms a convex side surface corresponding to the concave surface of the base mould and a concave side surface thereof opposite the convex side surface, which assist the forming pin to aim accurately toward the desired position of the workpiece heated by the heating unit according to the center of the concave side surface of the desired position. In such way, the heating unit successfully makes up deficiencies of the tolerance of the forming pin and the base mould and limitation of operator performing concentricity, which accordingly facilitates to form a high accuracy dimple on the workpiece.

When the workpiece is a load beam of a suspension of a head gimbal assembly, the employment of the heating unit assists to enhance tractility of the load beam and accordingly assists a good static attitude of the load beam formed a dimple by the forming pin punching, and thus the assembly of the slider with the suspension of the HGA could be accurate and slider's read/write ability of the assembled HGA could be excellent.

Other aspects, features, and advantages of this invention will become apparent from the following detailed description when taken in conjunction with the accompanying drawings, which are a part of this disclosure and which illustrate by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
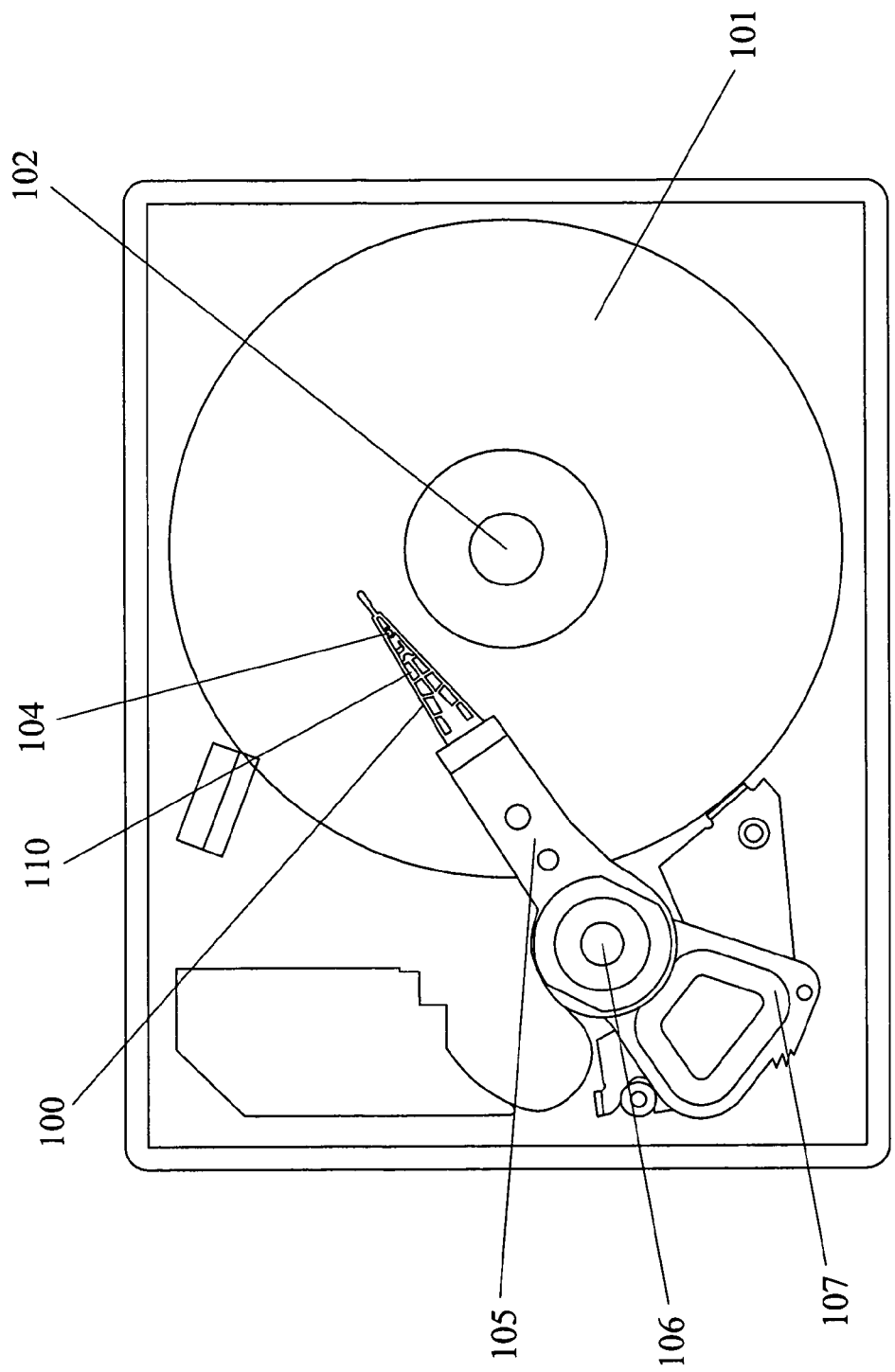
FIG. 1 is a schematic view of a conventional hard disk drive.
Figure 2:
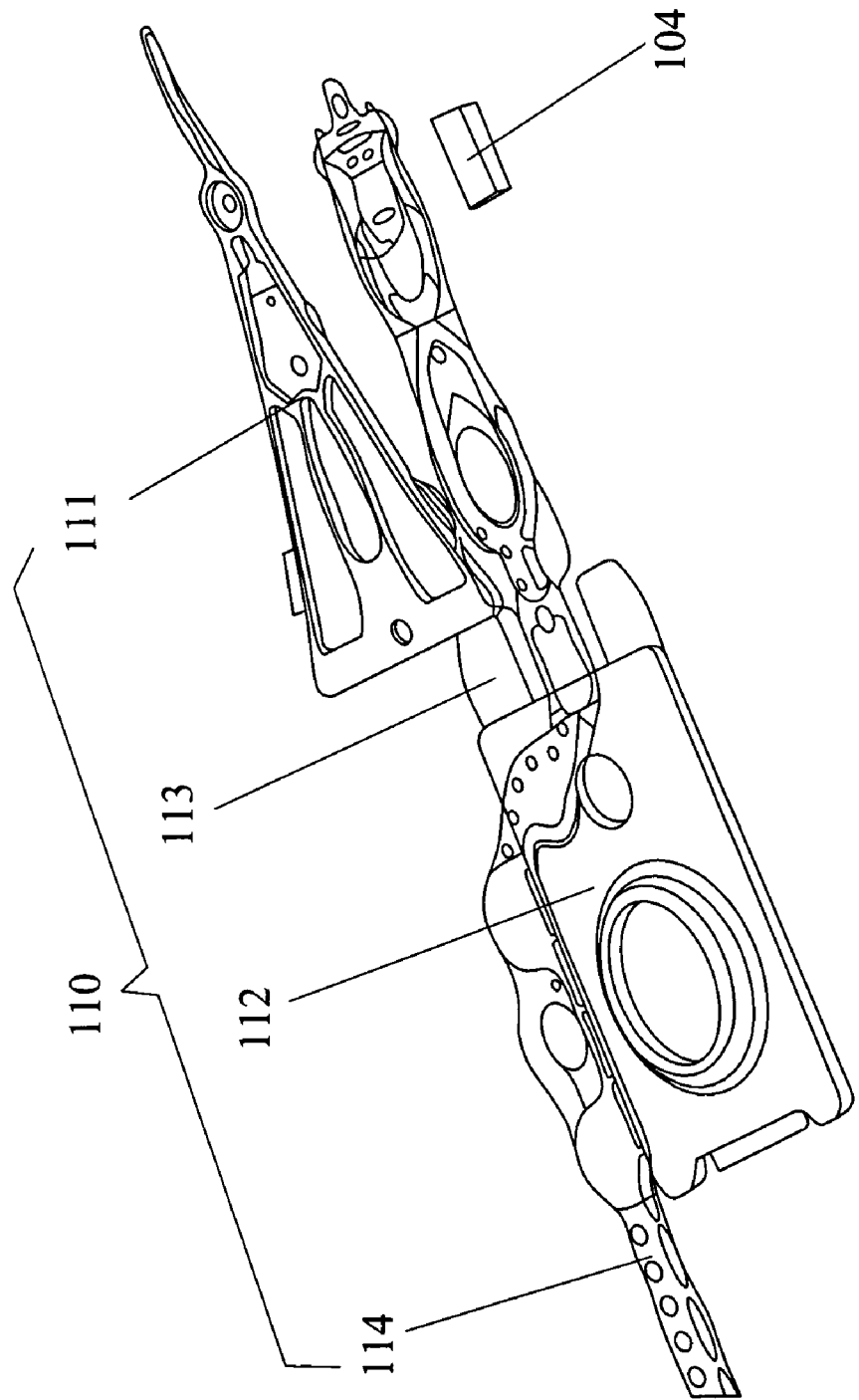
FIG. 2 is a exploded perspective view of a head gimbal assembly of the disk drive shown in FIG. 1.
Figure 3A:
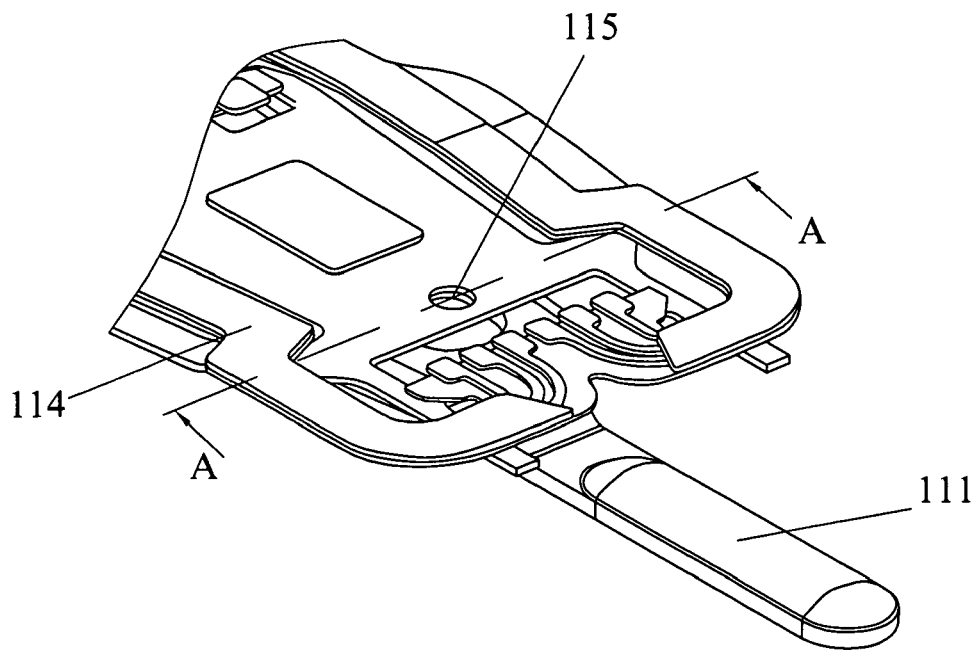
FIG. 3a is a partial enlarged view of a suspension of the head gimbal assembly shown in FIG. 2.
Figure 3B:
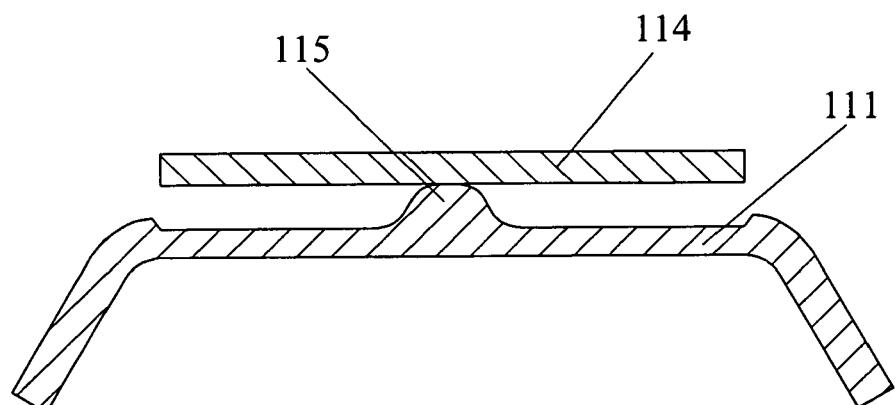
FIG. 3b is a sectional view of the suspension shown in FIG. 3a taking along line A-A.
Figure 4A:
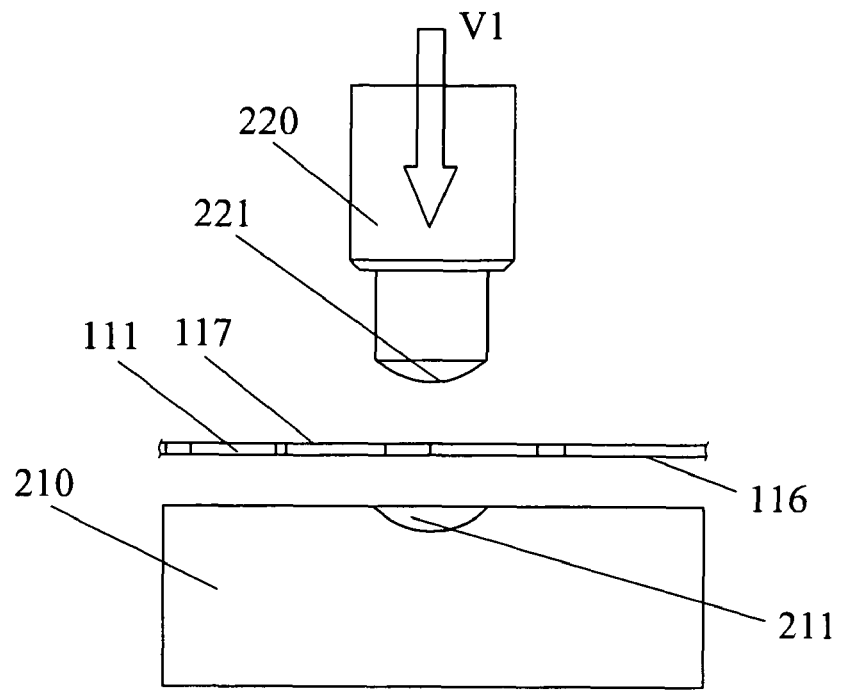
FIGS. 4a-4b show a conventional dimple forming process.
Figure 4B:
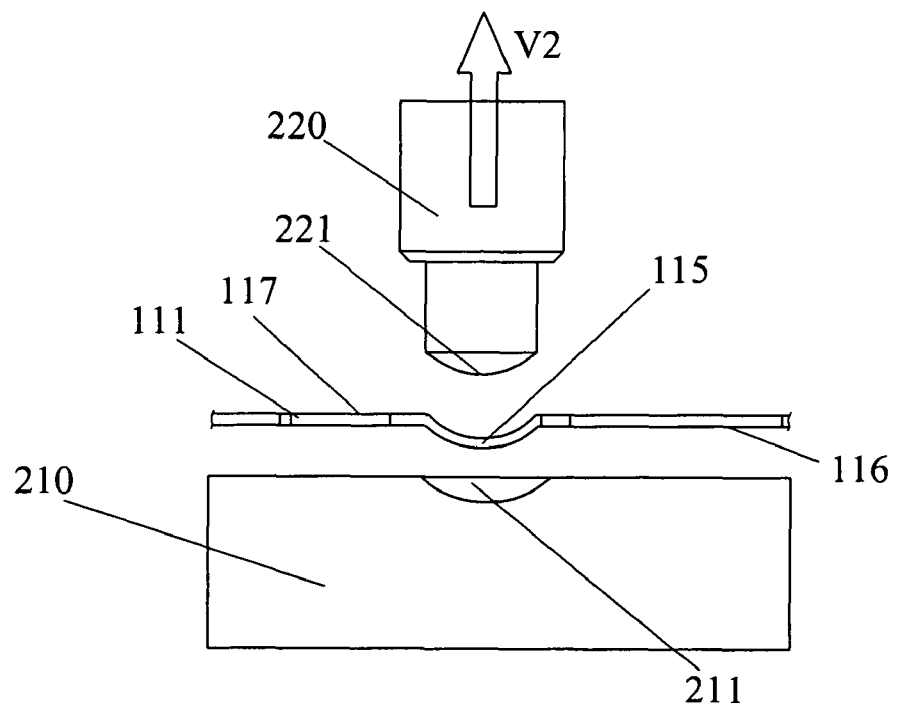

Various preferred embodiments of the invention will now be described with reference to the figures, wherein like reference numerals designate similar parts throughout the various views.

Figure 5:
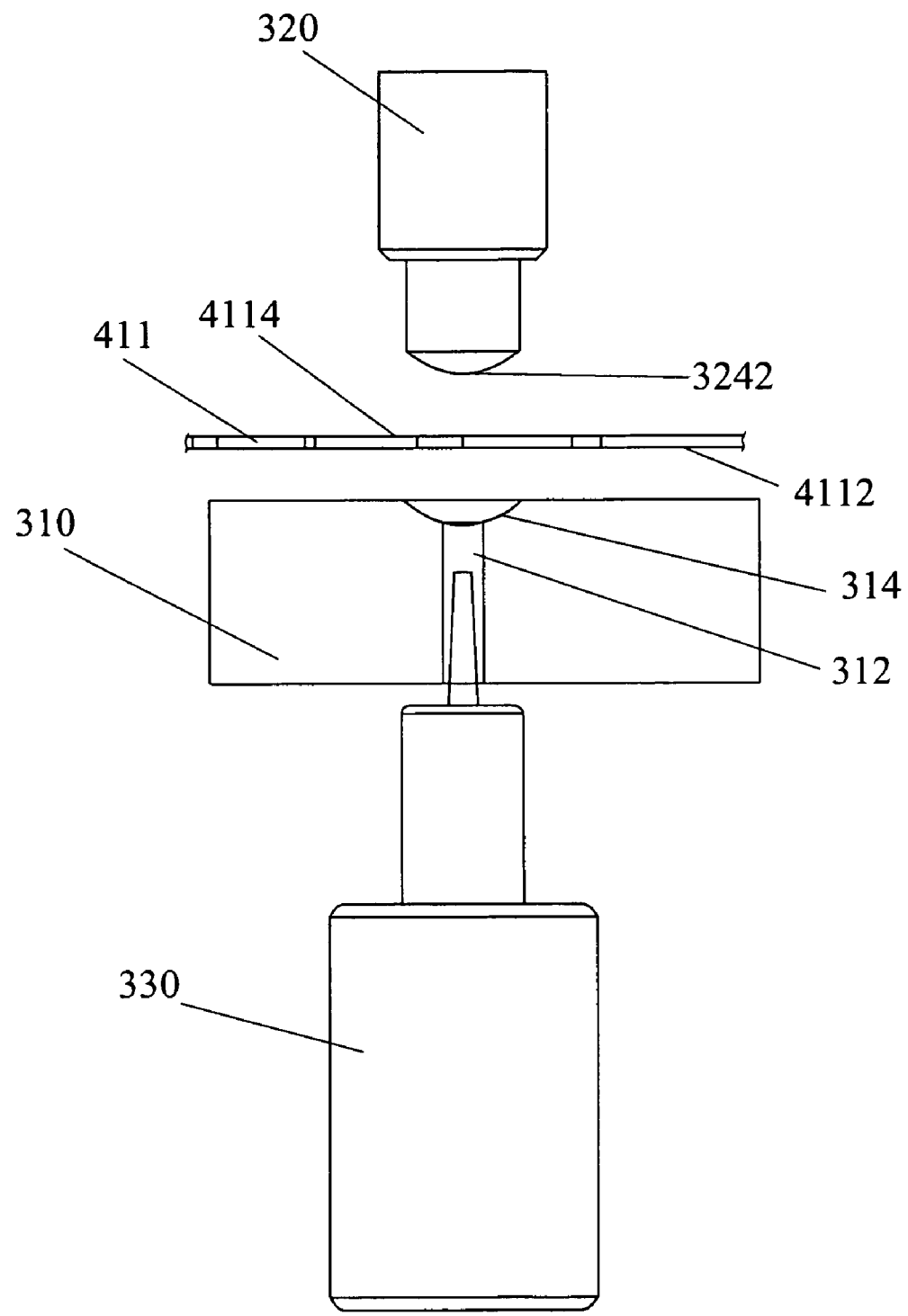
FIG. 5 is a schematic view of a dimple forming apparatus according to an embodiment of the present invention.

FIG. 5 is a schematic view of a dimple forming apparatus according to an embodiment of the present invention. Referring to FIG. 5, the dimple forming apparatus for forming a dimple on a load beam 411 at a desired position comprises a base mould 310 with a concave surface 314 and a hole 312 adjoining the concave surface 314, a forming pin 320 with a spherical surface 3242 and a heating unit 330 having a wave beam. The wave beam has features of heatability and is preferably laser or soft beam. The heating unit 330 is positioned below the concave surface 314 of the base mould 310 and could send the wave beam through the hole 312 to heat the desired position of the load beam 411 for enhancing tractility of the desired position of the load beam 411. The base mould 310 could be positioned below a first surface 4112 of the load beam 411 with the concave surface 314 of the base mould 310. The forming pin 320 could be positioned above a second surface 4114 of the load beam 411 opposite the first surface 4112 with the spherical surface 3242 of the forming pin 320 aimed toward the desired position of the second surface 4114 of the load beam 411 heated by the heating unit 330.

Basted on the above illustrations, the dimple forming apparatus introduces a heating unit 330 and makes the heating unit 330 sending wave beam to heat the desired position of the load beam 411 for enhancing tractility of the desired position of the load beam 411, accordingly, under the heat action of the wave beam, the load beam 411 warms up gradually and are soften, which makes the load beam 411 process excellent tractility. Accordingly, the warm and soft portion of the load beam 411 with tractility facilitates the load beam 411 punched by the forming pin 320 with buffering to be deformed gradually. Therefore, the load beam 411 produce low stress in the punching area during the punching action of the forming pin 320 and accordingly achieves good static attitude thereof.

Figure 7A:
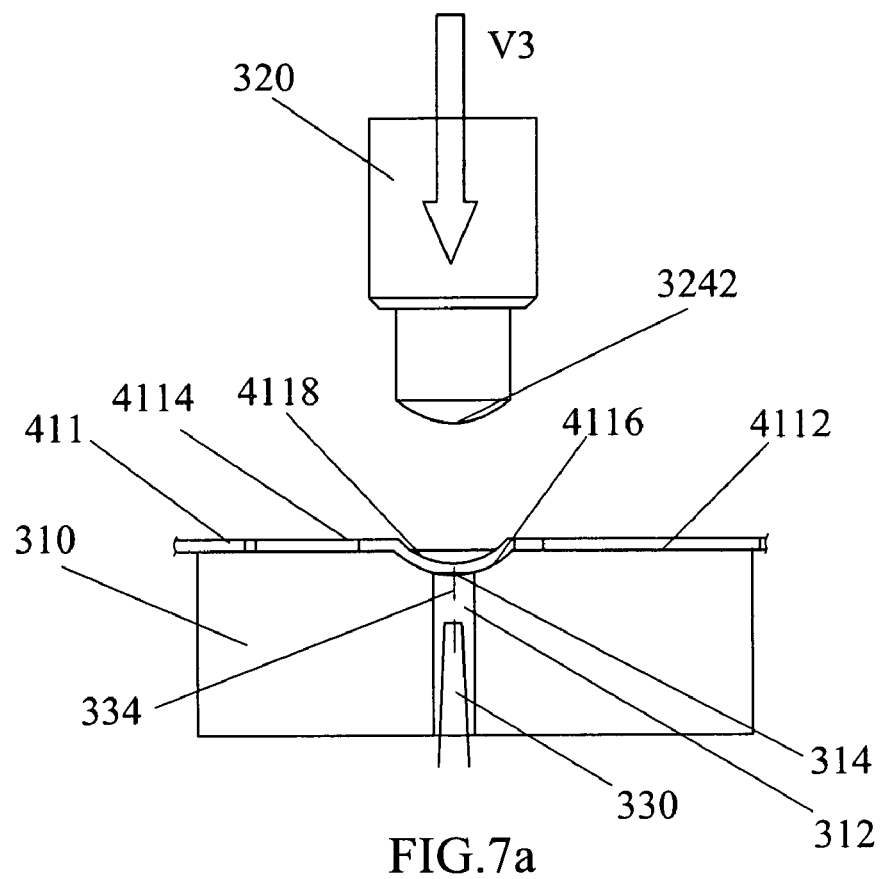
FIGS. 7a-7c specifically shows how to forming a dimple using the method shown in FIG. 6.

In addition, the heatability feature of the wave beam sent by the heating unit 330 enables the wave beam to heat the desired position of the load beam 411 to soften the desired position into the concave surface 314 of the base mould 310, therefore, the desired position of the load beam 411 softened by the heating unit 330 forms a convex side surface 4116 (as shown in FIG. 7a) thereof corresponding to the concave surface 314 of the base mould 310 and a concave side surface 4118 (as shown in FIG. 7a) thereof opposite the convex side surface 4116, and the spherical surface 3242 of the forming pin 320 could be aimed accurately toward the desired position of the second surface 4114 of the load beam 411 softened by the heating unit 330 according to the center of the concave side surface 4118 of the desired position. In such way, the heating unit 330 successfully makes up deficiencies of the tolerance of the forming pin 320 and limitation of operator performing concentricity, which accordingly facilitates to form a high accuracy dimple on the load beam 411.

It should be understood that the dimple forming apparatus could be suitable to any workpiece besides the load beam 411 and could also gain advantageous effects similar to the above load beam 411.

Figure 6:
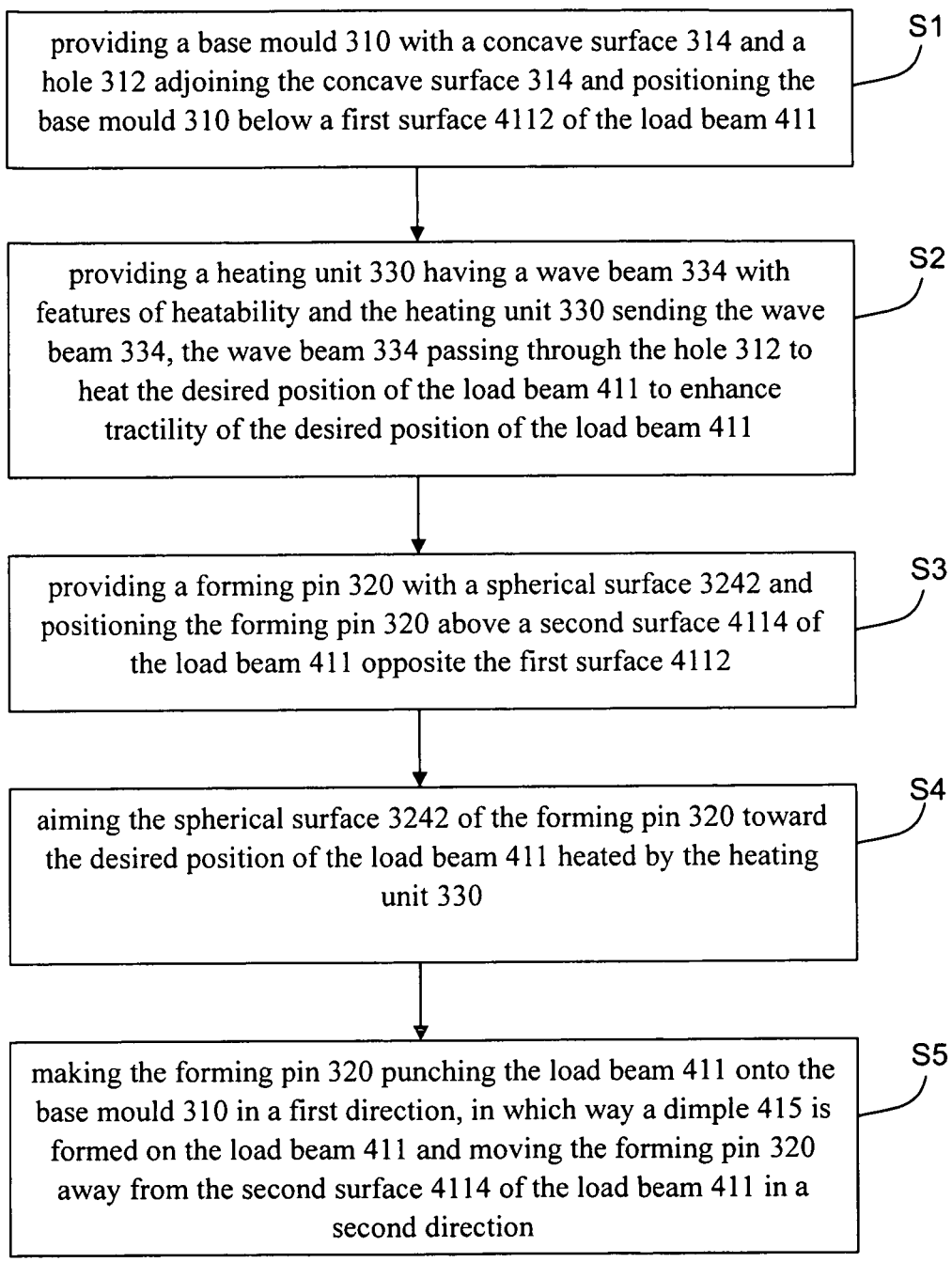
FIG. 6 is a flow chat showing a dimple forming method according to an embodiment of the present invention.
Figure 7B:
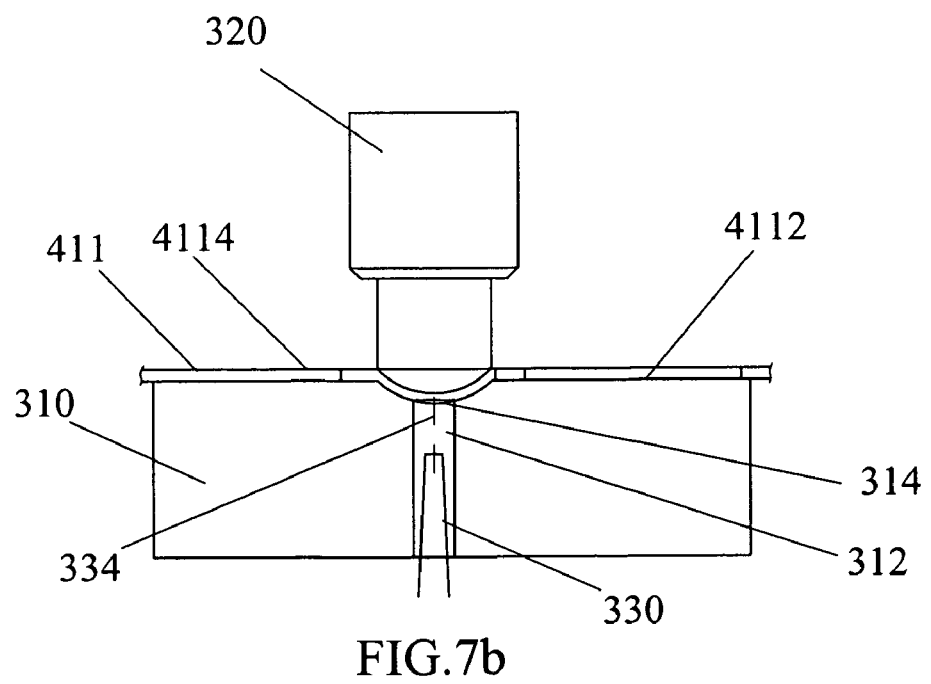
Figure 7C:
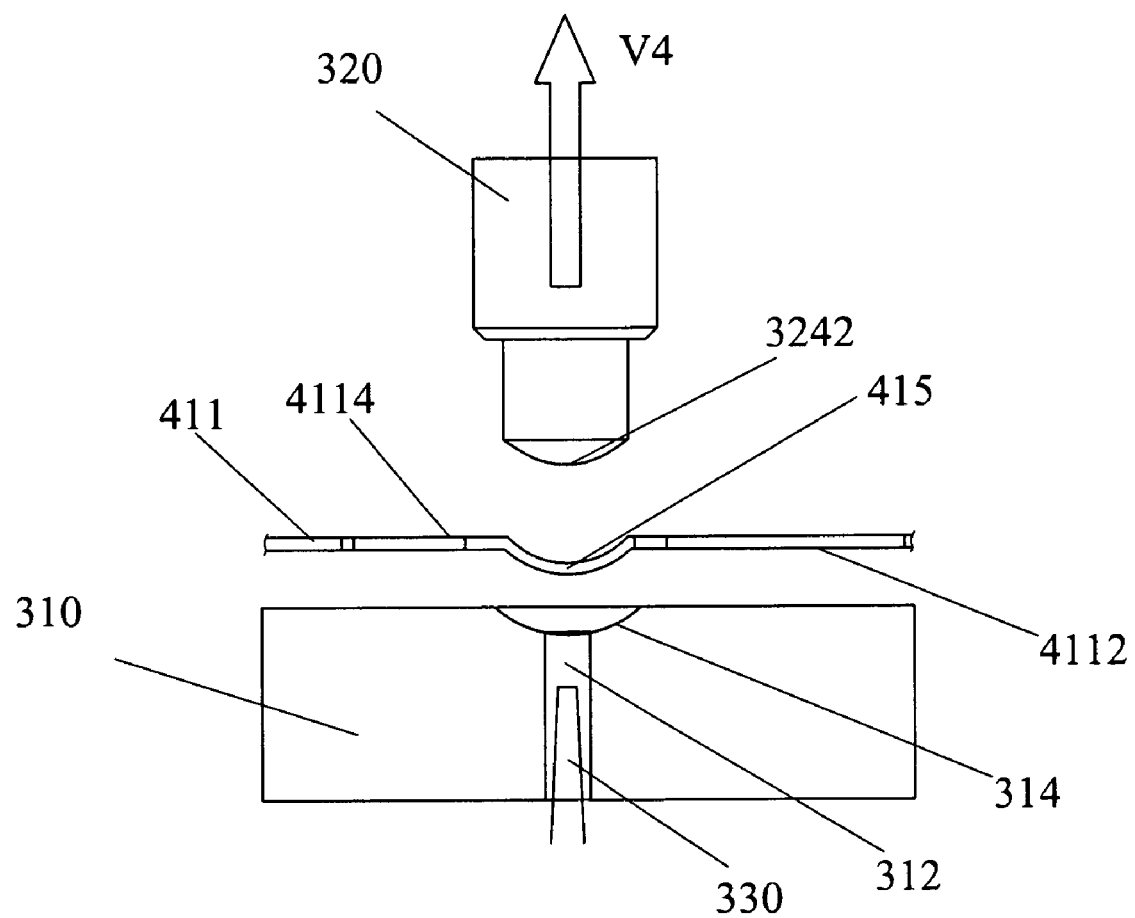

FIG. 6 is a flow chat showing a dimple forming method according to an embodiment of the present invention and FIGS. 7a-7c specifically shows how to forming a dimple using the method shown in FIG. 6. As shown in FIG. 6, the dimple forming method comprises the steps of: providing a base mould 310 with a concave surface 314 and a hole 312 adjoining the concave surface 314 and positioning the base mould 310 below a first surface 4112 of the load beam 411 (step S1); providing a heating unit 330 having a wave beam 334 with features of heatability and the heating unit 330 sending the wave beam 334, the wave beam 334 passing through the hole 312 to heat the desired position of the load beam 411 to enhance tractility of the desired position of the load beam 411 (step S2); providing a forming pin 320 with a spherical surface 3242 and positioning the forming pin 320 above a second surface 4114 of the load beam 411 opposite the first surface 4112 (step S3); aiming the spherical surface 3242 of the forming pin 320 toward the desired position of the load beam 411 heated by the heating unit 330 (step S4); making the forming pin 320 punching the load beam 411 onto the base mould 310 in a first direction (shown as arrow V3 in FIG. 7a), in which way a dimple 415 is formed on the load beam 411 (step S5); moving the forming pin 320 away from the second surface 4114 of the load beam 411 in a second direction (shown as arrow V4 in FIG. 7c) (step S5). Specifically shown in FIG. 7c, the dimple 515 formed according to the method has a convex side on the first surface 4112 of the load beam 411 and a concave side on the second surface 4114 of the load beam 411.

In the dimple forming method illustrated above, the heating unit 330 sends the wave beam 334 to heat the desired position of the load beam 411 to soften the desired position of the load beam 411 into the concave surface 314 of the base mould 310, the desired position of the load beam 411 softened by the heating unit 330 forming a convex side surface 4116 thereof according to the concave surface 314 of the base mould 310 and a concave side surface 4118 thereof opposite the convex side surface 4116, and the spherical surface 3242 of the forming pin 320 aims toward the desired position of the load beam 411 heated by the heating unit 330 according to the center of the concave side surface 4118. In addition, the heating unit 330 could be positioned below the concave surface 314 of the base mould 310, and the wave beam is preferably laser or soft beam. It should be understood that the dimple forming method could be suitable to forming a dimple on any workpiece besides the load beam 411 and could also gain advantageous effects similar to the above load beam 411.

A head gimbal assembly of an embodiment comprises a slider and a suspension having a flexure to support the slider and a load beam 411 assembled with the flexure. The load beam 411 has a dimple 415 thereon and the dimple 415 of the load beam 411 engages with the flexure at a position corresponding to a center of the slider. Because the structure process of the head gimbal assembly of the present invention is well known to persons ordinarily skilled in the art, a detailed description of such structure and assembly is omitted herefrom.

A method for manufacturing a head gimbal assembly of an embodiment comprises comprising the steps of: proving the load beam 411 with the dimple 415 formed thereon; providing a flexure with a slider supporting area; assembling the load beam 411 and the flexure with the dimple 415 of the load beam 411 engaging with a center of the slider supporting area of the flexure; providing a slider and potting the slider onto the slider supporting area of the flexure. Because the assembly process of the head gimbal assembly of the present invention is well known to persons ordinarily skilled in the art, a detailed description of such structure and assembly is omitted herefrom.

The foregoing description of the present invention has been presented for purposes of illustration and description. It is not intended to be exhaustive or limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A dimple forming apparatus for forming a dimple on a workpiece at a desired position, comprising:
   a base mould with a concave surface, the base mould configured to be positioned below the workpiece;
   a heating unit configured to heat the desired position of the workpiece for enhancing tractility of the desired position of the workpiece; and
   a forming pin with a spherical surface, the forming pin configured to be positioned above the workpiece with the spherical surface of the forming pin aiming toward the desired position of the workpiece heated by the heating unit;
   wherein the heating unit heats to soften the desired position of the workpiece into the concave surface of the base mould, and the desired position of the workpiece softened by the heating unit forms a convex side surface thereof corresponding to the concave surface of the base mould and a concave side surface thereof opposite the convex side surface, and the spherical surface of the forming pin aims toward the desired position of the workpiece heated by the heating unit according to the center of the concave side surface of the desired position.

2. The dimple forming apparatus as claimed in claim 1, wherein the heating unit comprises a wave beam with a feature of heatability, and the heating unit sends the wave beam to heat the desired position of the workpiece.

3. The dimple forming apparatus as claimed in claim 2, wherein the base mould further comprises a hole adjoining the concave surface, and the wave beam sent by the heating unit passes through the hole to heat the desired position of the workpiece.

4. The dimple forming apparatus as claimed in claim 1, wherein the heating unit is positioned below the concave surface of the base mould.

5. The dimple forming apparatus as claimed in claim 2, wherein the wave beam is laser or soft beam.

6. The dimple forming apparatus as claimed in claim 1, wherein the workpiece is load beam of a suspension of a head gimbal assembly.

7. A dimple forming method for forming a dimple on a workpiece at a desired position comprising, the method comprising:
   providing a base mould with a concave surface and positioning the base mould base below the workpiece;
   providing a heating unit and the heating unit heating the desired position of the workpiece to enhance tractility of the desired position of the workpiece;
   providing a forming pin with a spherical surface and positioning the forming pin above the workpiece;
   aiming the spherical surface of the forming pin toward the desired position of the workpiece heated by the heating unit; and
   making the forming pin punching the workpiece;
   wherein the heating unit heats to soften the desired position of the workpiece into the concave surface of the base mould, the desired position of the workpiece softened by the heating unit forms a convex side surface thereof corresponding to the concave surface of the base mould and a concave side surface thereof opposite the convex side surface, and
   wherein the aiming of the spherical surface of the forming pin toward the desired position of the workpiece heated by the heating unit comprises aiming the spherical surface of the forming pin toward the desired position of the workpiece heated by the heating unit according to the center of the concave side surface.

8. The dimple forming method as claimed in claim 7, wherein the heating unit comprises a wave beam with a feature of heatability, and the heating of the desired position of the workpiece comprises:
   the heating unit sending the wave beam; and
   the wave beam heating the desired position of the workpiece.

9. The dimple forming method as claimed in claim 8, wherein the base mould further comprises a hole adjoining the concave surface, and the wave beam heating the desired position of the workpiece comprises:
   the wave beam passing through the hole to heat the desired position of the workpiece.

10. The dimple forming method as claimed in claim 7, wherein the method further comprises, after the step of providing a heating unit:
    positioning the heating unit below the concave surface of the base mould.

11. The dimple forming method as claimed in claim 8, wherein the wave beam is a laser or soft beam.

12. The dimple forming method as claimed in claim 7, wherein the workpiece is load beam of a suspension of a head gimbal assembly.

13. A head gimbal assembly comprising:
    a slider, and
    a suspension having a flexure to support the slider and a load beam assembled with the flexure, the load beam has a dimple thereon formed according to the dimple forming method of claim 8 and the dimple of the load beam engaging with the flexure at a position corresponding to a center of the slider.

14. A method for manufacturing a head gimbal assembly, the method comprising:
    proving a load beam;
    forming a dimple on the load beam according to the dimple forming method of claim 7;
    providing a flexure with a slider supporting area;
    assembling the load beam and the flexure with the dimple of the load beam engaging with a center of the slider supporting area of the flexure; and
    providing a slider and potting the slider onto the slider supporting area of the flexure.

* * * * *